E. B. MEATYARD.

CAR TRUCK.

No. 10,289. Reissued Feb. 20, 1883.

Witnesses

W. C. Collier,

Jno. C. MacGregor.

Inventor

Edward B. Meatyard

By Osmun & Fischer

Attorneys.

UNITED STATES PATENT OFFICE.

EDWARD B. MEATYARD, OF GENEVA, WISCONSIN.

CAR-TRUCK.

SPECIFICATION forming part of Reissued Letters Patent No. 10,289, dated February 20, 1883.

Original No. 251,618, dated December 27, 1881. Application for reissue filed February 23, 1882.

*To all whom it may concern:*

Be it known that I, EDWARD B. MEATYARD, of Geneva, in the county of Walworth and State of Wisconsin, have invented a new and useful Improvement in Car-Trucks, of which the following is a full, clear, and exact description.

The object of my invention is to prevent the side beams of car-trucks from sagging, and the consequent twisting of the axle-box, which, in a truck of ordinary construction, results from the connections of the top and bottom chords of the truss being at the sides of the axles toward the middle of the truss.

The invention consists in side beams and axle-boxes constructed to balance the compressive and tensile strains on the truss at points directly over the axles, as hereinafter described and claimed.

Reference is to be had to the accompanying drawings, forming part of this specification, in which similar letters of reference indicate corresponding parts in both the figures.

Figure 1:
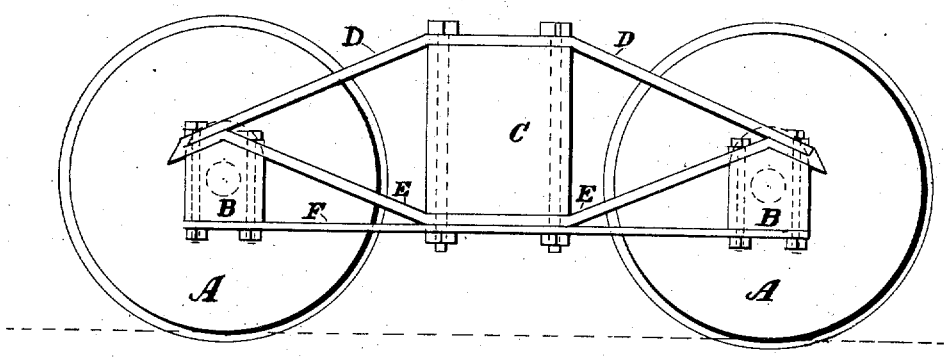
Figure 2:
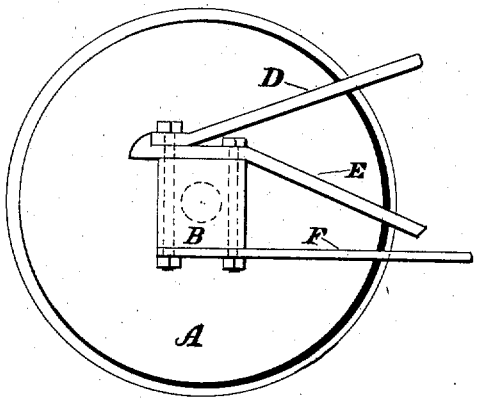

Figure 1 is a side elevation of the improved truck. Fig. 2 shows a modification.

A A are the wheels; B B, the axle-boxes; C, the bolster; D, the arched bar or upper chord. E is the inverted arched bar or lower chord of the truss, and F is the tie-bar. These parts are constructed as usual, except in the particulars hereinafter set forth.

In Fig. 1 the axle-boxes B are sloped or beveled on their upper sides to the angles of the arched bars, thereby forming a double slope on each axle-box, the apex being over the vertical center line of the axle, so that the bars D E meet on such line and directly above the center of the axle. In Fig. 2 the top of the axle-box is of the usual flat form. With each form of axle-box the arched bar or upper chord of the side beam is affixed to the box near its outer edge, while the lower chord is affixed at the inner edge. It will be seen that by this construction the weight on the truss is transmitted to the vertical center line of the axle, and is thus equally distributed on the box, instead of the strain being localized at the inner edge of the box, where it tends to twist the box. This construction remedies a great defect in the ordinary iron truck—that is to say, the tendency to sag down by the pressure, which the tie-bar is not sufficient to resist.

It is evident that a beveled bearing-block on the axle-box will answer the purpose of giving support to the truss end, in place of the slopes being formed on the box proper, and, further, that the slopes may be dispensed with, as shown in Fig. 2. In either case the side bars are inflexible and solid.

Having thus fully described my invention, I claim as new and desire to secure by Letters Patent—

1. In a car-truck, a side beam composed of an upper chord extending in a straight line from the bolster to the point of first attachment to the axle-box, said point being on the top of the box at the farther side, and a lower chord extending in a straight line from the bolster to the point of first attachment to the axle-box, said point being on the top of the axle-box at the nearer side, substantially as described, for the purpose of balancing the tensile and compressive strains at a point vertically above the axis of revolution.

2. In car-trucks, side beams formed by truss-bars united at their ends upon the axle-boxes at or near the center line of the boxes, substantially as and for the purposes set forth.

3. The combination, in car-trucks, of arched side bars, D E, and axle-boxes B, formed with their top portions sloped to the angles of the side bars, substantially as shown and described.

4. The double sloped or beveled axle-boxes B, combined with trussed side bars, D E, that unite at the apex of the slopes, substantially as shown and described.

EDWARD B. MEATYARD.

Witnesses:

JNO. C. MACGREGOR,

M. B. GAGE.